B. M. Townsend.
Road Scraper.
№ 6,643. Patented Aug. 14, 1849.
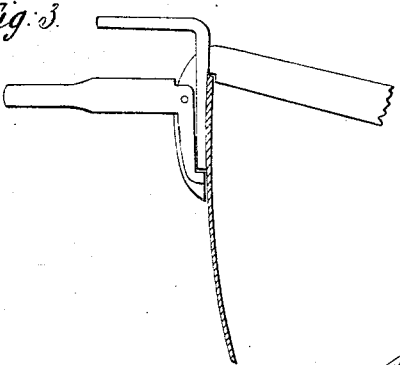
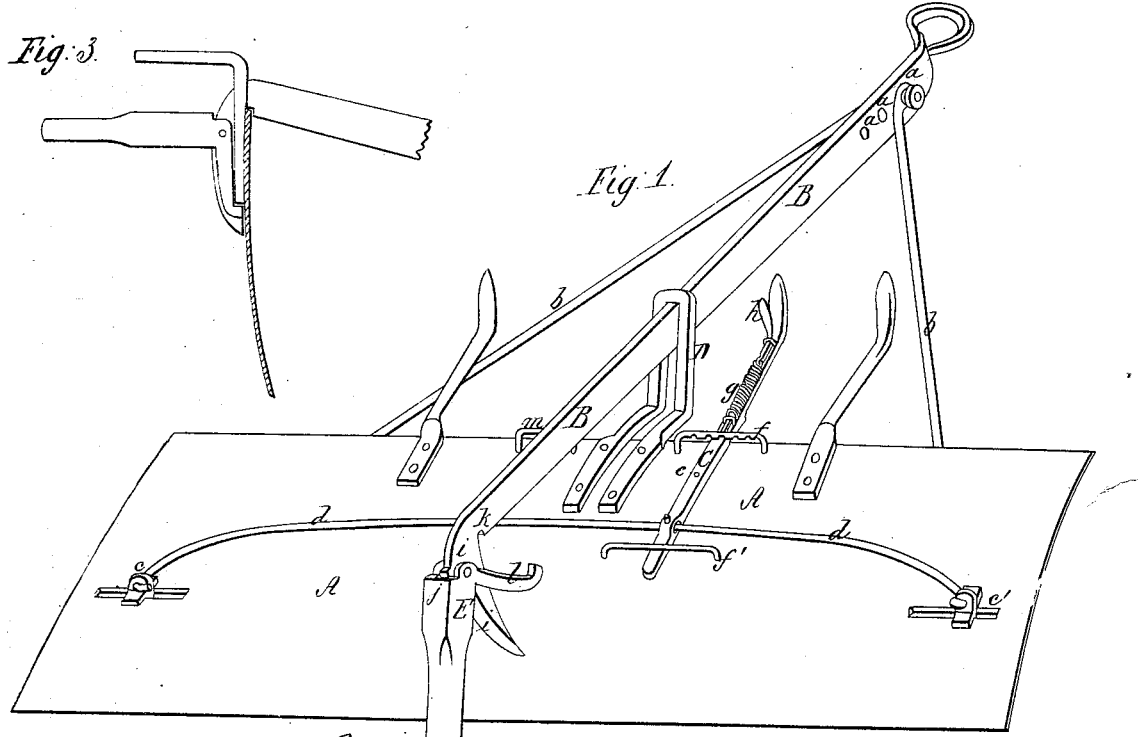
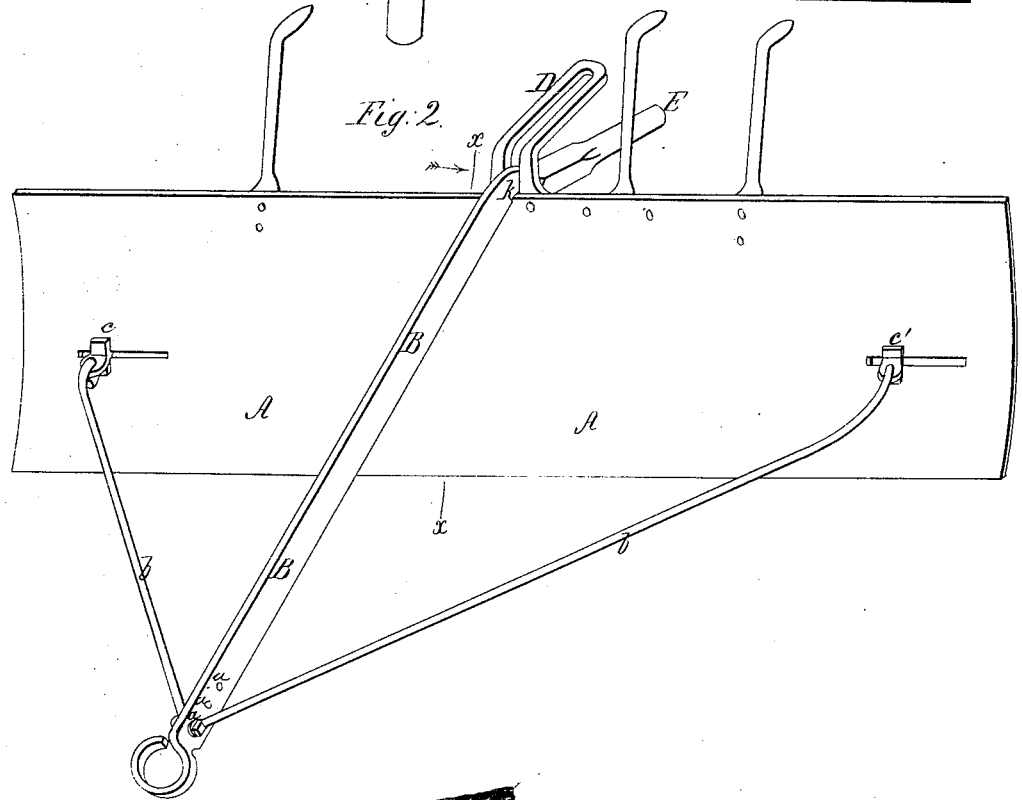

UNITED STATES PATENT OFFICE.

BENJ. M. TOWNSEND, OF QUINCY, ILLINOIS.

ROAD-SCRAPER.

Specification of Letters Patent No. 6,643, dated August 14, 1849.

*To all whom it may concern:*

Be it known that I, BENJAMIN M. TOWNSEND, of Quincy, in the county of Adams and State of Illinois, have invented certain new and useful Improvements in Road-Scrapers, of which the following is a full, clear, and exact description, reference being had to the accompanying drawing, forming part of this specification, in which—

Figure 1 is a view of my improved road scraper with the share turned forward, Fig. 2 a front view of the scraper with the share erect, and Fig. 3 a section at the line $x\ x$ of Fig. 2.

My invention consists in a device by which the angle formed by the share with the line of draft can be changed while the scraper is in motion; and in the peculiar manner in which the upper edge of the share is connected with the hind end of the beam, by which it is securely attached to the beam when scraping, but easily and instantly disconnected therefrom to allow the share to turn and discharge the scraped earth.

In the drawing A represents the share of the scraper which is made of plate iron slightly curved in its cross section to increase its stiffness, and enable it to gather the earth more readily. B is the beam, made of a flat bar of iron. The hind end of the beam is connected with the share, its front end is pierced with a series of holes, $a, a$, and is connected with the extremities of the share by hinged rods $b, b$ of equal length, which are attached to the front end of the beam by a bolt passing through an eye in the front extremity of each rod, and any one of the series of holes $a, a$, which will give the shart the proper inclination. The hind extremities of the rods are also turned into an eye, and are each linked into an eye bolt $c, c'$, which slides in a longitudinal slot near each extremity of the share. The two sliding eye bolts are connected with each other behind the share by a rod $d$, this rod is connected with the short arm of a lever C, projecting upward above the share and attached to it by a pivot $e$ on which it can vibrate. The lever may be held to the share by two broad staples or guards $f, f'$, the one $f'$ below the connecting rod $d$, the other $f$, above the pivot. The upper extremity of the longer arm of the lever is formed into a handle, by moving which the rod $d$ and with it the sliding eye bolts $c, c'$, are moved either to the right or left, the latter acting through the rods $b, b$ upon the front end of the beam move it in the same direction thus changing the angle formed by the share with the line of draft.

In order to keep the share at any required angle at which it may be placed, notches or holes are made in the upper guard $f$, in which the lower end of a spring bolt $g$, attached to the back of the longer arm of the lever C, can engage; the upper end of this bolt is formed into a handle $h$ which projects backward immediately below the handle of the lever C. When it is necessary to change the angle of draft, the hand of the driver is applied to the handle of the lever, and grasping it together with the handle of the spring bolt, raises the latter from the hole in the guard, and moving the lever moves the eye bolts and the front end of the beam with which they are connected by the rods $b, b$, in the required direction. As soon as the grasp is relaxed, the spring bolt descends, and entering one of the holes in the guard securely locks the lever in the required position.

The arrangement for securing the upper edge of the share to the beam, and disengaging it therefrom is as follows: the beam is passed through a bent staple D, attached to the share and projecting above its upper edge, by means of this staple the beam is kept in a central position with respect to the share, whether the latter be turned over or erect; the extremity of the beam behind the slot is bent downward (at $i$) to support the back of the share; a notch $k$ is cut in the angle of the bend to receive the upper edge of the share and prevent it from turning forward; a weighted handle E projects horizontally backward from the upper part of the bent extremity of the beam, this handle is forked at $j$, to embrace the beam and is attached to it by a bolt which allows a little play in a vertical direction at the joint; one of the forks is lengthened and bent downward, and its end is formed into a hook $l$ which catches beneath a shoulder formed by the lower extremity of one arm of the staple shaped bar D through which the beam passes. While scraping, the weight of the handle (E) keeps the hook ($l$) in its position, and prevents the beam from rising and freeing the upper edge of the share from the notch ($k$) in the angle of the bent beam; by raising the handle the hook is drawn backward from the shoulder, and as soon as the handle has moved far enough to accomplish this, the crotch of the fork (*j*) strikes the beam and (the joint becoming rigid) raises from the share, which being liberated from the notch (*k*) turns forward, and passes over the earth which it has collected.

A broad staple (*m*) is attached to the back of the share to which the hand of the driver is applied to raise it again for scraping, and the moment the share is raised to its position, the notch of the beam falls upon its upper edge and the hook being self acting secures it firmly to the beam.

It will be perceived that by these improvements but one person is required to work the scraper, who can drive the horses with one hand and direct the scraper, and as ordinary scrapers require two persons, the work of one man is dispensed with; the sliding eye bolts are nearer the lower edge of the share than they are to the upper and but a slight exertion is required to right the scraper so that the whole work can be performed by a boy old enough to drive a team instead of requiring a strong man to tip the scraper. The lock formed by the hook (*l*) prevents the share from being accidentally disconnected from the beam when the former comes in contact with sods, hard lumps of earth or stones, which accident is of frequent occurrence in the ordinary turning scraper, and is a source of much annoyance to the operator besides greatly impeding the progress of the work, and the facility with which the angle of draft is changed while in motion, enables the operator to scrape across a hill side without keeping the heads of the team continually turned up the hill and forcing the horses to walk diagonally forward. It also, like the hillside plows, adapts itself to the inclination in whichever direction the scraping is performed.

Latching the beam directly upon the scraper gives the machine the greatest possible degree of simplicity and strength, while the bent staple through which the hinder end of the beam is passed keeps it always in place when the share is raised and secured to the beam by the self acting hook.

What I claim as my invention and desire to secure by Letters Patent is—

The device (consisting of brace rods (*b*), sliding eye bolts (*c, c'*,), connecting rod (*d*) hand lever (C) and spring catch (*g*) for changing the angle formed by the share with the line of draft,) arranged and operated substantially as herein set forth.

B. M. TOWNSEND.

Witnesses:
E. S. RENWICK,
P. H. WATSON.